(12) United States Patent
Sjödén, deceased et al.

(10) Patent No.: US 6,312,199 B1
(45) Date of Patent: Nov. 6, 2001

(54) CUTTING TOOL

(75) Inventors: Johan Sjödén, deceased, late of Gävle; Eva Karin Margaretha Sjödén, Hägersten; Anna Maria Birgitta Sjödén-Nygrén; Astrid Ingrid Margaretha Sjödén, both of Gävle, all of (SE)

(73) Assignee: Sandvik Aktiebolag, Sandviken (SE)

( * ) Notice: Subject to any disclaimer, the term of this patent is extended or adjusted under 35 U.S.C. 154(b) by 0 days.

(21) Appl. No.: 09/403,922

(22) PCT Filed: Apr. 27, 1998

(86) PCT No.: PCT/SE98/00765
§ 371 Date: May 30, 2000
§ 102(e) Date: May 30, 2000

(87) PCT Pub. No.: WO98/48963
PCT Pub. Date: Nov. 5, 1998

(30) Foreign Application Priority Data

Apr. 28, 1997 (SE) .................................................. 9701603

(51) Int. Cl.⁷ ............................. B23B 27/00; B23B 29/04
(52) U.S. Cl. ..................................... 407/11; 407/4; 407/6; 407/64
(58) Field of Search .................................. 407/11, 4, 5, 6, 407/64; 47/101; 408/56, 59, 60, 61; 409/137

(56) References Cited

U.S. PATENT DOCUMENTS

| | | | |
|---|---|---|---|
| 4,213,354 | * 7/1980 | Dahinden | 82/1.11 |
| 4,534,803 | * 8/1985 | Asano et al. | 409/137 X |
| 4,695,208 | 9/1987 | Yankoff . | |
| 4,708,538 | * 11/1987 | Kubo et al. | 408/59 |
| 4,951,578 | * 8/1990 | von Hass et al. | 409/136 |
| 5,148,728 | 9/1992 | Mazurkiewicz . | |
| 5,275,516 | * 1/1994 | Liaw | 409/136 |
| 5,340,242 | 8/1994 | Armbrust et al. . | |
| 5,388,487 | * 2/1995 | Danielsen | 82/158 |
| 6,076,441 | * 6/2000 | Billington | 82/160 |

FOREIGN PATENT DOCUMENTS 9014913  12/1990 (WO) .

\* cited by examiner

*Primary Examiner*—Henry Tsai
(74) *Attorney, Agent, or Firm*—Burns, Doane, Swecker & Mathis, L.L.P.

(57) ABSTRACT

A metal cutting tool includes a tool body which carries a cutting insert and has nozzles for directing cooling fluid against the insert. The tool body defines a longitudinal axis and is insertable into a holder in an axial direction, whereby a surface of the tool body abuts a surface of the holder. Those surfaces include respective holes that are aligned with one another in a radial direction for transferring cooling fluid from a channel of the holder to a channel of the tool body. A seal surrounds one of the holes and is compressed when the tool body is inserted into the holder.

9 Claims, 3 Drawing Sheets

CUTTING TOOL

TECHNICAL FIELD OF THE INVENTION

Figure 1:
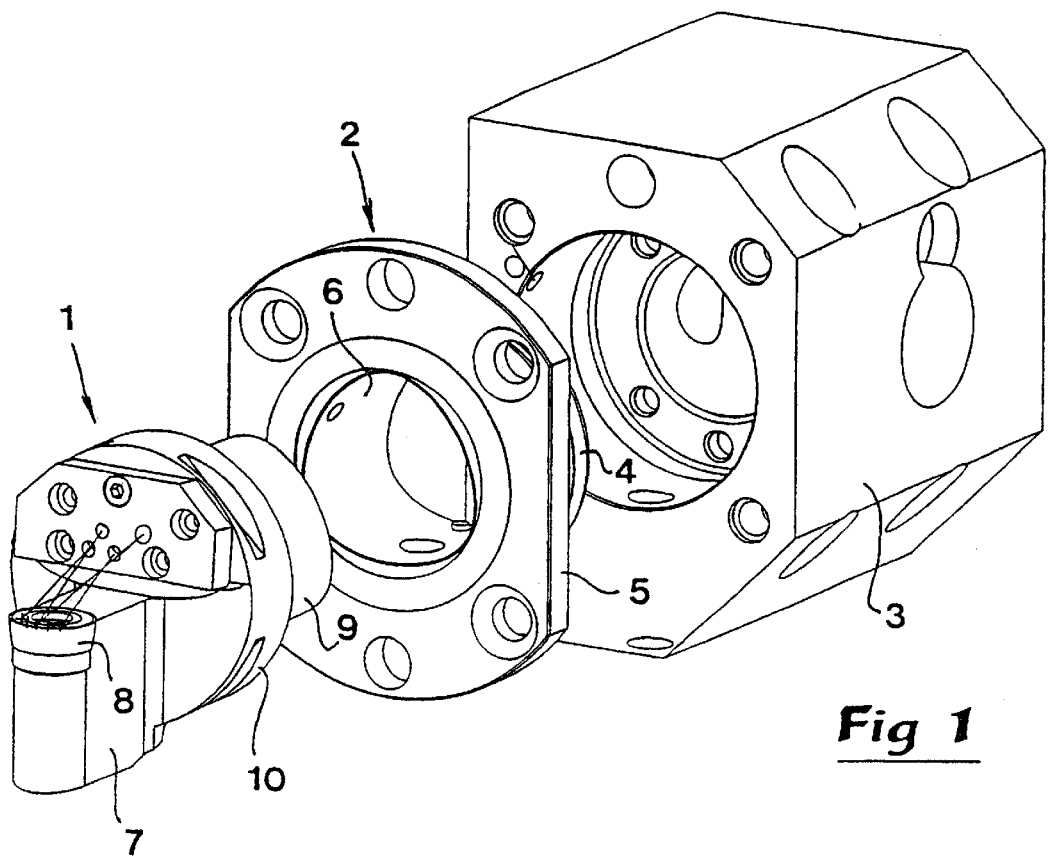

This invention relates to a tool for metal cutting, said tool comprising a main body having a first part, one or several cutting means being detachably mountable on said first part, and an axially opposite second part of the male type, said second part being applicable in a seat in a clamping unit, through which a cooling medium for said cutting means may be fed, via a channel, to at least one nozzle, through which the cooling medium is allowed to be ejected in a direction towards said cutting means.

PRIOR ART

Tools of the type defined above are often used in machining centres, e.g. multi-purpose lathes for turning/milling. Depending on their function such tools may be equipped with widely different cutting means, i.e. inserts, milling cutters, drills, parting tools, etc. In connection with most tools the two axially opposite parts of the main body of the tool are spaced from each other via a radially projecting, flange ring that constitutes an integral part of the tool body, said first part carrying one or several cutting means may have a widely varied shape depending on the field of use. The second male type part is intended to be fastened in a mating seat in a clamping unit of the machine in question, said part being in the shape of a sleeve having an internal cavity that emerges at the free end of the male part, cooling medium, normally liquid, may be fed to the tool through said cavity. Said sleeve shaped male part has generally conical or tapering shape in order to be distinctly wedged up in a seat in the clamping unit, said seat having a corresponding shape, and that the clamping is effected by means of a mechanism incorporated in the clamping unit, said mechanism being able to on one hand internally gripping the male part and on the other hand pulling said male part into the seat to a firmly wedged position. Although tools having genuine conical male parts (i.e. male parts having circular cross-section) exist in practice male parts of the type CAPTO are preferred, said parts having a polygonal, essentially triangular cross-section that guarantees the tool to automatically have a correct position as regards the angle of rotation relative to the clamping units (said unit including a seat having corresponding polygonal shape).

Cooling of the cutting means of previously known tools is effected by a cooling liquid or other medium being fed to the cavity in the male part, said liquid or medium then being fed to a nozzle, via a smaller channel, and then ejected in a direction towards the cutting means. The cooling liquid is fed from a feeding device located centrally in the clamping unit in axial direction into the cavity of the male part. The pressure of the cooling liquid that is fed into the cavity is limited due to the fact that the liquid applies an axial force upon the tool, said axial force striving to detach the tool from the clamping unit. In practice the allowed liquid pressure is at most within the interval 50–70 bar. If a tool should be detached due to excessive pressures the machined workpiece may be damaged and destroyed; this being especially disastrous in connection with expensive workpieces.

Within modern engineering industry the materials of the workpieces in question are more frequently hard to machine, e.g. blanks for manufacturing of engine blocks. For this reason a definite need exists to increase the cooling liquid pressure on one hand to effectively cool the cutting means and on the other hand to properly remove chips from the workpiece. However, it has not been possible to increase the liquid pressure in connection with previously known tools due to the fact that the cooling liquid then would apply too high axial forces upon the tool.

OBJECTS AND FEATURES OF THE INVENTION

The present invention aims at overcoming the shortages mentioned above in connection with previously known tools and to create an improved tool. A basic object of the invention is thus to create a tool through which cooling liquid or cooling medium may be fed at extra ordinary pressure up to the nozzles in question. In a certain aspect the invention aims at creating a tool by the aid of which high pressure cooling liquid and low pressure cooling liquid, if needed, may be ejected alternately towards the cutting means. It is also an object to create a tool that is able to receive high pressure cooling liquid without giving rise to liquid leakage problems.

According to the invention at least the primary object of the invention is realised by an arrangement in which cooling fluid is transferred radially to the tool.

BRIEF DESCRIPTION OF THE ENCLOSED DRAWINGS

Figure 2:
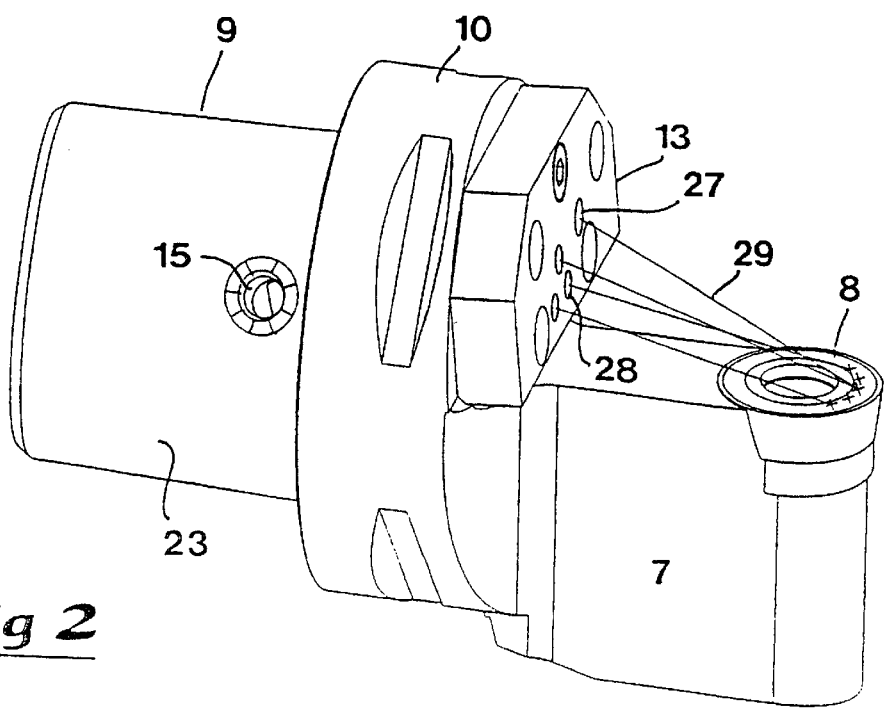
Figure 3:
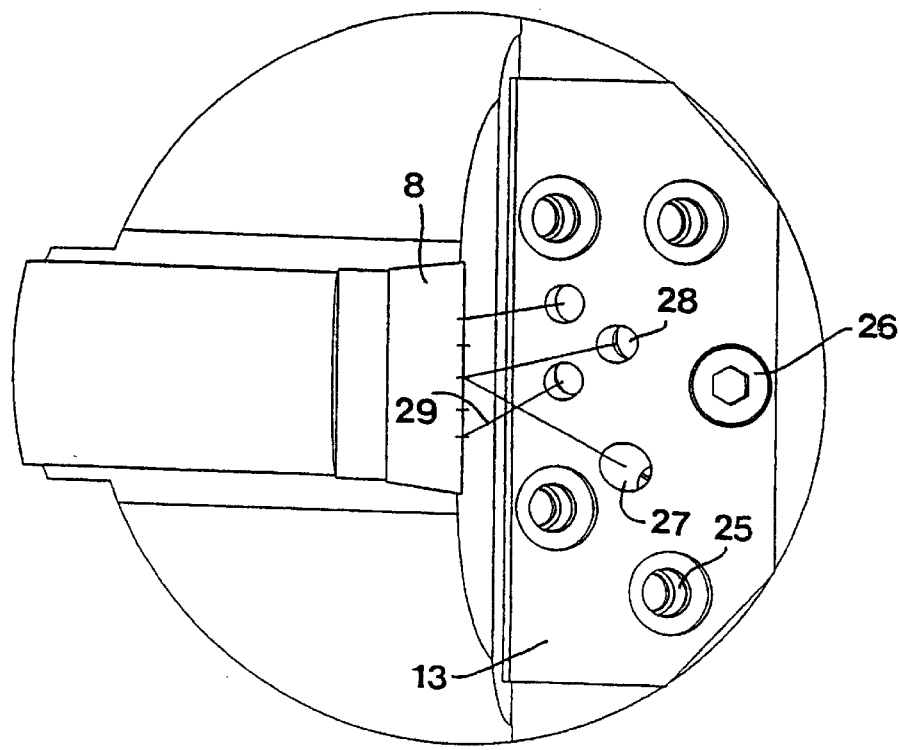
Figure 4:
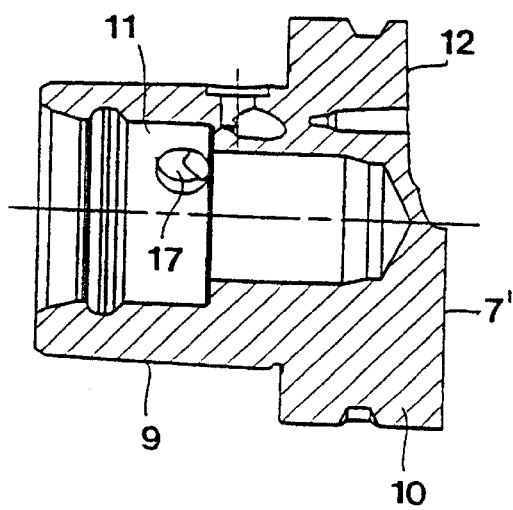
Figure 5:
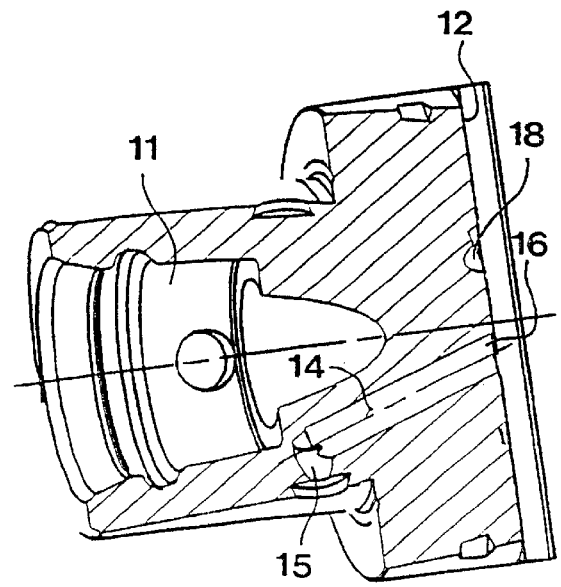
Figure 6:
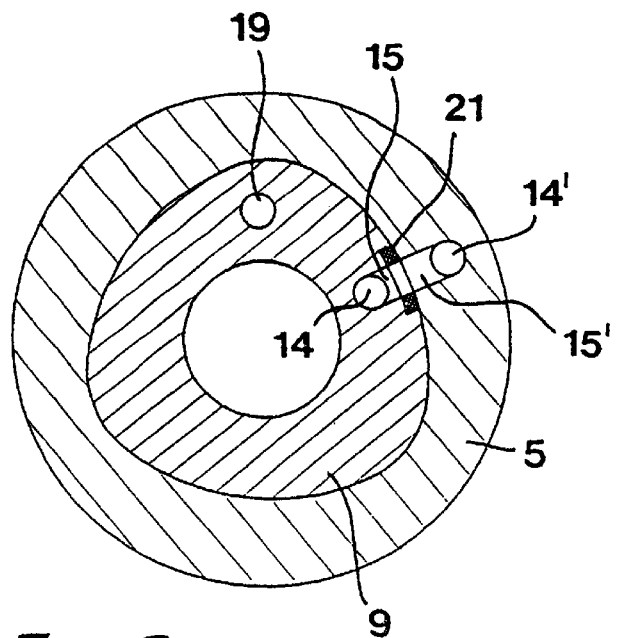
Figure 7:
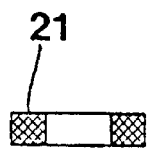
Figure 8:
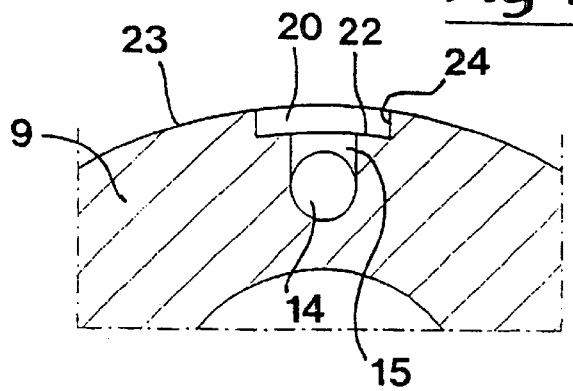
Figure 9:
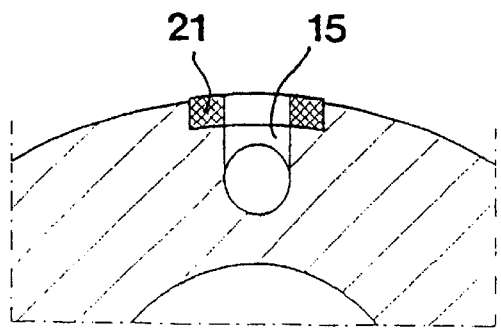

In the drawings:

FIG. 1 shows a perspective exploded view of a tool and a clamping unit for the fixation of the tool, FIG. 2 shows a schematic perspective view that illustrates parts of the tool, especially a nozzle plate, FIG. 3 shows an end view that illustrates said nozzle plate, FIG. 4 shows a partial longitudinal section through the tool, FIG. 5 shows an analogous, although perspective, longitudinal section at an angle relative to the section according to FIG. 4, FIG. 6 shows a cross-section through the male part of the tool and a surrounding portion of the clamping unit, FIG. 7 shows a cross-section through a sealing ring, FIG. 8 shows a partial, enlarged section that illustrates a recess cut into the envelope surface of the male part, said recess being intended to receive the sealing ring according to FIG. 7, and FIG. 9 shows a corresponding section where the sealing ring is applied in the recess.

DETAILED DESCRIPTION OF A PREFERRED EMBODIMENT OF THE INVENTION

In FIG. 1 the reference numeral 1 designates a tool according to the invention while the reference numeral 2 designates a clamping unit for receiving and fixing the tool 1. This clamping unit 2 may in its turn be attached to a supporting member designated by the reference numeral 3, said supporting member 3 begin incorporated in a machining centre. In the given example the clamping unit includes a tubular element 4 and a head 5 that includes a seat 6. In the example coupling of the tool with the clamping unit is effected via a coupling of the type CAPTO, said seat 6 having polygonal shape in cross-section and tapering shape in the axial direction.

The tool 1 comprises a first part 7 that may be equipped with a cutting means 8 in the shape of a cutting insert in the disclosed example. A second part 9, at the opposite side of the tool, is of the male type to make it possible to insert said part 9 into the seat 6. More precisely, the male part 9, as well as the set 6, has a polygonal shape in cross-section (see FIG. 6) and tapers towards its free end. In this connection it should be pointed out that the envelope surface of the male part 9, as well as the inner surface of the seat 6, has a curved shape. The male part is separated from the first insert holding part 7 via an annular flange portion 10 that constitutes an integral part of the tool body manufactured in one single piece.

Reference is now being made also to FIGS. 2–9, the FIGS. 4 and 5 illustrating that the male part 9 in this case is in the shape of a sleeve. This means that, in a previously known way, a cavity 11 is shaped within the male part. This cavity opens on one hand at the free end of the male part and terminates on the other hand at a suitable location within the tool main body. In the given example the cavity terminates in the area of the flange portion 10. In FIGS. 5 and 6 the first part 7 is not disclosed (said first part continuing beyond the section surface 7'). In practice, the part 7 does only occupy a semi-circular sector area while the other semi-circular sector has a surface 12 for receiving a nozzle plate 13 (see FIGS. 2 and 3). In FIG. 5 it is depicted how a first channel 14 extends between on one hand an essentially radial hole 15 that emerges in the envelope surface of the male part 9 and on the other hand an orifice 16 opening 16 in the surface 12. A second channel 19 extends between an internal orifice 17 opening in the cavity 11 and an orifice 18 opening in the surface 12. This channel 19 can be seen in FIG. 6.

It is essential for the present invention that the channel 14 emerges in the envelope surface of the male part 9, more precisely via the essentially radial hole 15. This means that cooling liquid of high pressure may be fed into the tool in the radial direction from the clamping unit 2 without applying any substantial axial forces upon the tool. In this connection it should be pointed out that the clamping unit 2 in its head 5 includes a corresponding radial hole 15' (see FIG. 6) and an axial channel 14' through which cooling liquid is fed, said head 5 having an essentially annular cross-section.

The provision of a reliable sealing between respective high pressure liquid channels in the clamping unit and the tool has been a problem hard to master. This problem has been solved in the way shown in FIGS. 7–9.

In connection with the radial hole 15 in the male part 9 of the tool, a recess 20 is provided, said recess being adapted to receive a sealing ring 21. This recess may be manufactured by spark discharge and is designed with a bottom 22 having the same curved shape as the envelope surface 23, of the male part 9. The sealing ring 21 in this case is of uniform thickness and has a square or rectangular cross-section. In other words, the ring at arbitrary locations along its endless extension has a rectangular, possibly square or cross-sectional shape. In practice the sealing ring is manufactured from an elastic material like rubber. Especially, a rubber material is preferred having extra ordinary hardness. While the hardness of rubber in conventional O-rings reaches 50–60 Shore it is suitable to use rubber having a hardness of 90 Shore in the ring according to the present invention. In its stress-free condition shown in FIG. 7 the sealing ring has a thickness that is somewhat larger than the depth of the recess 20. This means that the outer surface portion of the sealing ring, as long as the tool is removed from the clamping unit, will project, by a certain uniform distance, beyond the curved envelope surface 23 of the male part. When the male part is inserted into the seat of the clamping unit the elastic material of the ring will thus be compressed. In this connection it should be pointed out that the initially planar sealing ring according to FIG. 7 receives a bent or curved shape when it is pressed into the recess 20 and the outward surface of the ring adapts to the generally curved shape of the surrounding envelope surface 23.

When the male part of the tool is inserted into the seat of the clamping unit the elastic material of the ring 21 will be compressed, whereby said ring, due to its rectangular cross-section, will be firmly fastened in the annular space that is defined between the bottom 22, the annular surface 24 and the curved inner surface that surrounds the radial hole 15' in the clamping unit 5. When cooling liquid at high pressure passes from the radial hole 15' into the radial hole 15 of the male part the sealing ring 21 is only subjected to shear forces that constantly strive to further compress the ring in a direction transverse to the common centre axis of the holes. This means that the surface pressure of the sealing ring against surrounding annular seat surfaces is increased by increasing cooling liquid pressure; this guarantees an extremely sealing of the transition between the two radial holes.

Reference is now being made to FIGS. 2 and 3 showing how the plate 13, apart from a number of holes 25 for fastening screws 26, includes a number of holes for cooling liquid, i.e. one hole 27 for low pressure cooling liquid and three holes 28 for high pressure liquid. At the lower side of the plate 13 a recess (not visible) is provided in the area of the three holes 28, said recess being common for all three holes 28 in order to distribute high pressure cooling liquid from the channel 14 to all of the holes 28. The hole 27 for low pressure cooling liquid is connected to the channel 19. In practice all of the holes 27, 28 are completed by separate nozzle elements, not shown, that form the liquid into extremely thin jets (indicated by the lines 29) that, in response to the setting of the nozzle elements, can be directed towards desired portions of the cutting means.

Function and Benefits of the Invention

The described tool works in the following way. In case the cutting means of the tool, said cutting means may be one or several, is to be cooled by high pressure liquid, said liquid is fed to the tool via the channel 14' in the head of the clamping unit. After having passed through the radial holes 15', 15 and the cooperating, effectively performing sealing ring 21, the liquid is transported, via the channel 14, up to the recess at the lower side of the plate 13, said recess being common for the high pressure holes 28. The liquid is then distributed to the different holes 28 and their nozzles. When the liquid passes the nozzles it is ejected in as thin jets towards desired points of the cutting means in question. During cooling of the cutting means by the high pressure liquid cooling may simultaneously be effected by the low pressure liquid that after insertion into the cavity 11 passes through the channel 19 to the hole 27 and the adherent nozzle. By this possibility to simultaneously eject both high pressure cooling liquid as well as low pressure cooling liquid the benefit is achieved that the low pressure liquid system forms a reserve system that continues to cool the cutting means in case the supply of high pressure liquid for some reason unintentionally is interrupted. In this way it is guaranteed that the cutting means is not overheated in case the high pressure liquid supply would cease in an uncontrolled way. The presence of both a high pressure liquid system as well as a low pressure liquid system also offers the benefit of less energy consumption and thus cheaper low pressure liquid cooling can be used in case the workpiece is easy to machine and requires moderate cooling. The basic advantage of the invention is however that cooling liquid of very high pressure, e.g. in the area 500–1000 bar, may be used in connection with workpieces that are hard to machine in order to on one hand to effectively cool the cutting means in question and on the other hand to remove chips that adhere firmly to the machined portions of the workpiece.

Feasible Modifications of the Invention

The invention is not solely limited to the embodiment described and shown in the drawings. Thus the invention is also applicable in connection with tools where cooling only by high pressure liquid is desirable. In such cases the male part of the tool may be designed as a uniform body without any cavity for low pressure liquid. Although a sealing ring having uniform thickness and a recess having curved bottom are preferred in practice it is also feasible to design the recess with a planar bottom and the sealing ring with an outer surface that joins the envelope surface of the male part due to the fact that two diametrically opposite portions of the ring have larger height than two diametrically opposite ring portions that are displaced by 90°. The invention may also be modified in several other ways within the scope of the appending claims.

What is claimed is:

1. An apparatus for metal cutting, comprising:
    a tool comprising a first main body defining an axis and including:
        a first part having a cutter-receiving site adapted to detachably receive at least one metal cutter,
        a second part spaced axially in a rearward direction from the first part and including an envelope surface of axially tapering shape,
        a first channel section disposed in the first main body and opening into the envelope surface to form a radially extending first hole therein, and
        a nozzle disposed in the first body and spaced in the rearward direction from the cutter-receiving site, the nozzle communicating with the first channel section and being directed toward the cutter-receiving site;
    a clamping unit comprising a second main body including:
        a seat in which the second part is seated, the seat having an axially tapering shape corresponding to the axially tapering shape of the envelope surface, and
        a second channel section for conducting cooling fluid to the first channel section, the second channel section opening into the seat to form a radially extending second hole therein, the second hole being aligned with the first hole whereby the transfer of cooling fluid from the first hole to the second hole occurs in a radial direction;
    a recess surrounding one of the first and second holes; and
    a sealing ring disposed in the recess, the sealing ring formed of an elastic material and having a generally rectangular cross section, a thickness of the sealing ring in a stress free state being greater than a depth of the recess, whereby the sealing ring is pressed into the recess when the envelope surface is seated in the seat.

2. The apparatus according to claim 1 wherein the first main body includes an additional channel for conducting cooling fluid, and an additional nozzle communicating with the additional channel for directing the cooling fluid toward the cutter site, the cooling fluid conducted through the additional channel being of less pressure than the cooling fluid conducted through the first and second channel sections.

3. The apparatus according to claim 2 wherein the second part includes a cavity opening into a face of the second part, the cavity communicating with the additional channel for conducting the cooling fluid thereto.

4. The apparatus according to claim 3 wherein the sealing ring has a uniform thickness around its circumference.

5. The apparatus according to claim 1 wherein the recess is formed in the envelope surface to surround the first hole.

6. The apparatus according to claim 5 wherein the recess includes a bottom having the same curvature as the envelope surface, the sealing ring having a uniform thickness.

7. An apparatus for metal cutting, comprising;
    a tool comprising a first main body defining an axis and including:
        a first part having a cutter-receiving site adapted to detachably receive at least one metal cutter,
        a second part spaced axially from the first part and including an envelope surface of axially tapering shape,
        a first channel section disposed in the first main body and opening into the envelope surface to form a radially extending first hole therein, and
        a nozzle disposed in the first main body, the nozzle communicating with the firs channel section and being directed toward the cutter-receiving site;
    a clamping unit comprising a second main body including:
        a seat in which the second part is seated, the seat having an axially tapering shape corresponding to the axially tapering shape of the envelope surface, and
        a second channel section for conducting cooling fluid to the first channel section, the second channel section opening into the seat to form a radially extending second hole therein, the second hole being aligned with the first hole whereby the transfer of cooling fluid from the first hole to the second hole occurs in a radial direction;
    a recess surrounding one of the first and second holes; and
    a sealing ring disposed in the recess, the sealing ring formed of an elastic material and having a generally rectangular cross section, a thickness of the sealing ring in a stress free state being greater than a depth of the recess, whereby the sealing ring is pressed into the recess when the envelope surface is seated in the seat;
    wherein the first main body includes an additional channel for conducting cooling fluid, and an additional nozzle communicating with the additional channel for directing the cooling fluid toward the cutter site, the cooling fluid conducted through the additional channel being of less pressure than the cooling fluid conducted through the first and second channel sections.

8. The apparatus according to claim 7 wherein the second part includes a cavity opening into a face of the second part, the cavity communicating with the additional channel for conducting the cooling fluid thereto.

9. The apparatus according to claim 8 wherein the sealing ring has a uniform thickness around its circumference.

* * * * *